United States Patent [19]

Tokuda

[11] Patent Number: 5,053,809
[45] Date of Patent: Oct. 1, 1991

[54] PHOTOPRINTER
[75] Inventor: Kanji Tokuda, Kanagawa, Japan
[73] Assignee: Fuji Photo Film Co., Ltd., Kanagawa, Japan
[21] Appl. No.: 572,530
[22] Filed: Aug. 27, 1990
[30] Foreign Application Priority Data Sep. 5, 1989 [JP] Japan .................................. 1-229759

[51] Int. Cl.⁵ .............................................. G03B 27/52
[52] U.S. Cl. ......................................... 355/41; 355/68
[58] Field of Search ...................... 355/68, 40, 41, 38, 355/77

[56] References Cited

U.S. PATENT DOCUMENTS

| 4,264,196 | 4/1981 | von Stein et al. | 355/41 |
| 4,707,120 | 11/1987 | Yamamoto | 355/38 |
| 4,982,224 | 1/1991 | Yamamoto et al. | 355/41 X |

FOREIGN PATENT DOCUMENTS 62-106448 5/1987 Japan .
62-286040 12/1987 Japan .

Primary Examiner—L. T. Hix
Assistant Examiner—D. Rutledge
Attorney, Agent, or Firm—Sughure, Mion, Zinn, Macpeak & Seas

[57] ABSTRACT

A photoprinter is provided in which a first detecting apparatus detects first information used to specify a magazine from a first information portion provided at each magazine when the magazine is mounted, and a second detecting apparatus detects second information related to setting of the exposure condition of the photosensitive material from a second information portion provided in an end portion of the photosensitive material loaded into the magazine when the magazine is mounted. A memory apparatus causes the first information detected by said first detecting apparatus to correspond to the second information detected by the second detecting apparatus and to store both information therein. A selecting apparatus selects the second information which has already been stored in the memory apparatus in association with the first information which has already been stored in the memory apparatus on the basis of the first information detected by the first detecting apparatus at this time when the magazine is mounted, and a rewriting apparatus rewrites the second information stored in the memory apparatus into second information detected at this time in case that the second information selected does not coincide with the second information detected by the second detecting apparatus at this time. Whereby, the information about the photosensitive material loaded into the magazine can be specified even when the magazine is replaced by another or the photosensitive material is refilled during the course of use.

19 Claims, 4 Drawing Sheets

FIG. 4

| | FLAG F | FLAG G | PROCESSING |
|---|---|---|---|
| DATA | RESET (0) | RESET (0) | ERROR PROCESSING |
| | SET (1) | RESET (0) | KEPT AS IT IS |
| | RESET (0) | SET (1) | INITIALIZE |
| | SET (1) | SET (1) | REWRITING |

PHOTOPRINTER

BACKGROUND OF THE INVENTION

1. Field of the Invention

The present invention relates to a photoprinter which causes lengthy photosensitive material to correspond to a magazine used for loading the photosensitive material wound in layered form so as to control the relation therebetween.

2. Description of the Related Art

In a photoprinter, a large number of print channels have been provided therein. Coefficients and constants employed in the amount-of-exposure arithmetic expression are determined according to a selected print channel. The amount of exposure is controlled such that a printed photograph with proper density and satisfactory color balance can be obtained. The print channels are determined by a combination of paper balance, lens balance, film balance and the like. Paper balance represents the type of photographic paper. The paper balance is determined by a combination of its sensitivity, type of emulsions, type of surface, the manufacturer, the manufacturing serial number of the photographic paper, etc. The lens balance represents the type of lenses. The lens balance is determined by a combination of the printing magnification, F value of the aperture, etc. The film balance represents the type of a photographic film, for example, color negative film. The film balance is determined by a combination of the manufacturer, the sensitivity of the film, the size thereof, etc.

A conventional photoprinter is, however, accompanied by the drawback in that when the paper magazine with the photographic paper contained therein is changed, an operator operates the control panel to manually input the paper balance. This makes the operation for inputting the same cumbersome and liable to cause malfunction.

One proposal has therefore been made in which paper balance information representing the type of the photographic paper indicated at a port formed in the paper magazine by a combination of bar codes and the concave and convex is automatically read when the paper magazine is loaded. The printing condition of a printer is then changed in accordance with this information (see Japanese Laid-Open Patent Publication No. 62-106448). This disclosure permits an improvement in operational performance because manual operation becomes unnecessary.

In the above arrangement, when magazines are packaging containers or dedicated magazines, the indication of the respective photographic papers applied thereon is identical to the photographic papers contained therein. However, when they are refillable magazines, the operator may erroneously load the wrong photographic papers or fail to change the indicators, so that there is improper indication, thus causing an imperfect printing condition setting.

On the other hand, as a technique for specifying the characteristics of a film such as speed, type, expiration data, sensitivity, latitude, etc. binary codes have been applied which represent such characteristics using a method in which perforations are combined depending on the presence or absence thereof between sprockets extending along the edge portions of a roll of 35 mm size film (see "19223 Photographic Film Coding" RESEARCH DISCLOSURE April 1980 No. 192).

As one example of this technique applied to indicate information about the photographic paper, the following has been proposed. At the end of the photographic paper photosensitive characteristics such as quality, maker, size, etc. are represented in the form of punch marks which are convertible to electric signals. These marks are automatically read so as to match the most suitable processing with the type of the photographic paper in accordance with data stored in advance (see Japanese Laid-Open Patent Publication no. 62-286040). According to this disclosure, since the information about the photographic paper is already written in the photographic paper itself, no improper indication of the same is effected even when the photographic paper is refilled.

However, it is only possible to apply the information about the photographic paper to the end portion of the photographic paper in the above-described arrangement. Thus, when the present magazine is replaced and mounted in the course of its use by another magazine in which a photographic paper different in type from the photographic paper presently in use is loaded therein, and the photographic paper in the course of its use is employed again, a point in the course of the photographic paper becomes an end portion thereof, so that the information about the photographic paper cannot be obtained. It is therefore necessary to devise a scheme for causing the magazine to correspond to the photographic paper to be loaded therein.

SUMMARY OF THE INVENTION

With the forgoing in view, it is a principle object of this invention to provide a photoprinter which can specify information about a photosensitive material loaded into a mounted magazine even when the magazine is replaced by another or the photosensitive material is refilled during the course of use.

According to one aspect of this invention, there is provided a photoprinter comprising:

a first detecting means for detecting first information used to specify a magazine for loading a photosensitive material provided for each magazine wound in a layered form to be contained therein;

a second detecting means for detecting second information related to setting of the exposure condition including at least the type of the photosensitive material loaded into the magazine;

memory means for causing the first information to correspond to the second information to store both information therein; and selecting, means for selecting at the time the magazine is set, the second information which has already been stored in the memory means in associated with the first information which has already been stored in the memory means on the basis of the first information detected by the first detecting means; and rewriting means for rewriting the second information previously stored in the memory means into newly detected second information in the case that said second information selected does not coincide with the new second information detected by the second detecting means.

According to the present invention, the memory means stores the first and second information therein such that the first information detected by the first detecting means coincides with the second information detected by the second detecting means. Thus, when the second detecting means does not detect the second information after the magazine has been mounted, i.e., when the photosensitive material is loaded into the magazine during the course of its use, the second information is read from the memory means based on the first information detected by the first detecting means to apply the same to the exposure condition.

When the second detecting means detects the second information, a new photosensitive material is loaded into the magazine. Then, a comparison of the second information already stored in the memory means with the newly detected second information is made based on the first information detected by the first detecting means. When they coincide with each other from the comparison result, the second information stored in the memory means can be applied to the exposure condition or the like as it is. On the other hand, when they do not coincide with each other, the photosensitive material different in type from the initially-loaded photosensitive material is loaded into the magazine. The rewriting means performs rewriting of the second information stored in the memory means into the newly detected second information. It is therefore possible to automatically read the most suitable exposure condition of the photosensitive material and the like when the magazine is reloaded.

As has been described above, the photoprinter according to the present invention can bring about a superb effect in that the information about the photosensitive material loaded into the magazine can be specified even when the magazine is replaced by another or the photosensitive material is refilled during the course of use.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 4 is a diagram for describing the contents of data processing depending on whether or not the data information about the photographic paper is stored and whether or not it is detected.

DETAILED DESCRIPTION OF THE PREFERRED EMBODIMENTS

Figure 1:
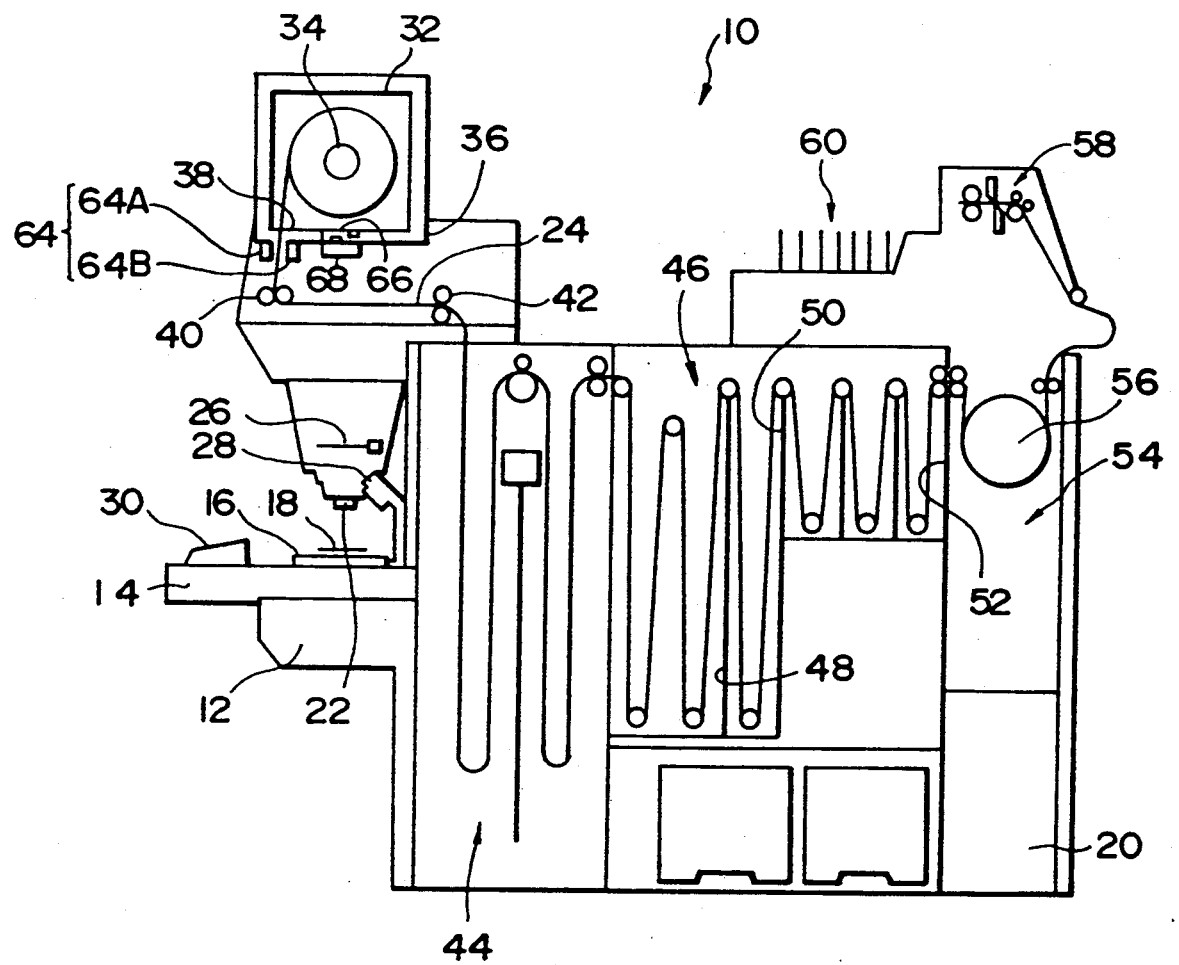
FIG. 1 schematically shows a photoprinter according to one embodiment of this invention.

FIG. 1 shows a photoprinter processor 10 according to one embodiment of this invention.

A white light emitted from a white light source (not shown) provided in a light source unit 12, is radiated to a negative film 18 retained by a negative carrier 16 disposed on a table 14. The light source unit 12 is respectively provided with unillustrated Y (yellow), M (magenta) and C (cyan) filters.

The light source unit 12 is connected to a control unit 20. When the light rays are radiated from the light source unit 12 in response to a signal from the control unit 20, they pass through the negative film 18 and reach color photographic paper 24, which is a photosensitive material, through a lens 22. An image recorded on the negative film 18 is then focused on the photographic paper 24. A shutter 26 is provided between the lens 22 and the color photographic paper 24. The shutter 26 is controlled by the control unit 20 so as to open or close the optical path. The negative carrier 16 is provided with a driving means. The negative film 18 is conveyed by the driving force of the driving means to allow image frames to be successively positioned in a print position.

A CCD sensor 28 is provided obliquely upward form the print position of the negative film 18 and receives the light rays which pass through the negative film 18 in order to divide the same into three primary colors (blue light, green light and red light), so that they are photoelectrically converted into signals. The photoelectrically-converted signals are delivered to the control unit 20 through a signal line.

A control panel 30 is mounted on the table 14 and provided with a dial used to input film balance information indicative of the type of the negative film 18 and another dial used to input lens balance information representative of the type of the lens 22. A specific print channel out of a plurality of print channels is set by the control of these dials. In addition, a print starting key is provided on the control panel 30. Coefficients and constants employed in the amount-of-exposure arithmetic expression are stored in the respective print channels, and those stored in a preset print channel are read.

In the present embodiment, the paper balance is divided into 4 types and the film balance into 10 type while the lens balance is divided into 15 types. In addition to the balances referred to above, there is provided one master balance, which is determined in accordance with individual photoprinters.

One end of the color photographic paper 24 is wound up in layered form on a reel 34 of a magazine 32. The color photographic paper 24 is received in a receiver 36 in a state in which an unexposed color photographic paper 24 is contained in the magazine 32. The magazine 32 has an outlet 38 from which an end portion of the color photographic paper 24 is slightly projected. A pair of drawing rollers 40 holds the end portion thereof therebetween and conveys the color photographic paper 24 to a position to be exposed. A pair of feeding rollers 42 is provided on the downstream side of the exposure position. The end portion of the color photographic paper 24 is conveyed out while being held between the rollers 42 so as to guide the color photographic paper 24 into a reservoir 44. The reservoir 44 stocks the exposed color photographic paper 24 in such a manner that it is shielded from light rays and has the function of canceling the difference between the exposure processing speed and the processing speed employed in a processor unit 46 located on the downstream side.

The processor unit 46 has a developer bath 48, a fixing bath 50 and a water washing bath 52. The color photographic paper 24 introduced from the reservoir 44 is successively guided into the respective baths at a predetermined conveying speed. After the color photographic paper 24 is subjected to the developing, fixing and water washing processes, it is guided into a drying unit 54. The drying unit 54 has a drying drum 56 incorporated therein onto which color photographic paper 24 is wound. A fan (not shown) blows hot air generated by a heater (not shown) onto the color photographic paper 24 thereby drying it. The dried color photographic paper 24 is conveyed to a cutter unit 58 where it is cut to prescribed lengths. Thereafter, the color photographic papers 24 thus cut are sorted, for example, into order numbers. Incidentally, the color photographic paper 24 between the drying unit 454 and the cutter unit 58 partly forms a loop, which is to cancel the difference in length between the color photographic paper 24 to be continuously conveyed by the drying unit 54 and that to be intermittently conveyed by the cutter unit 58.

The color photographic paper 24 will now be described.

Figure 2:
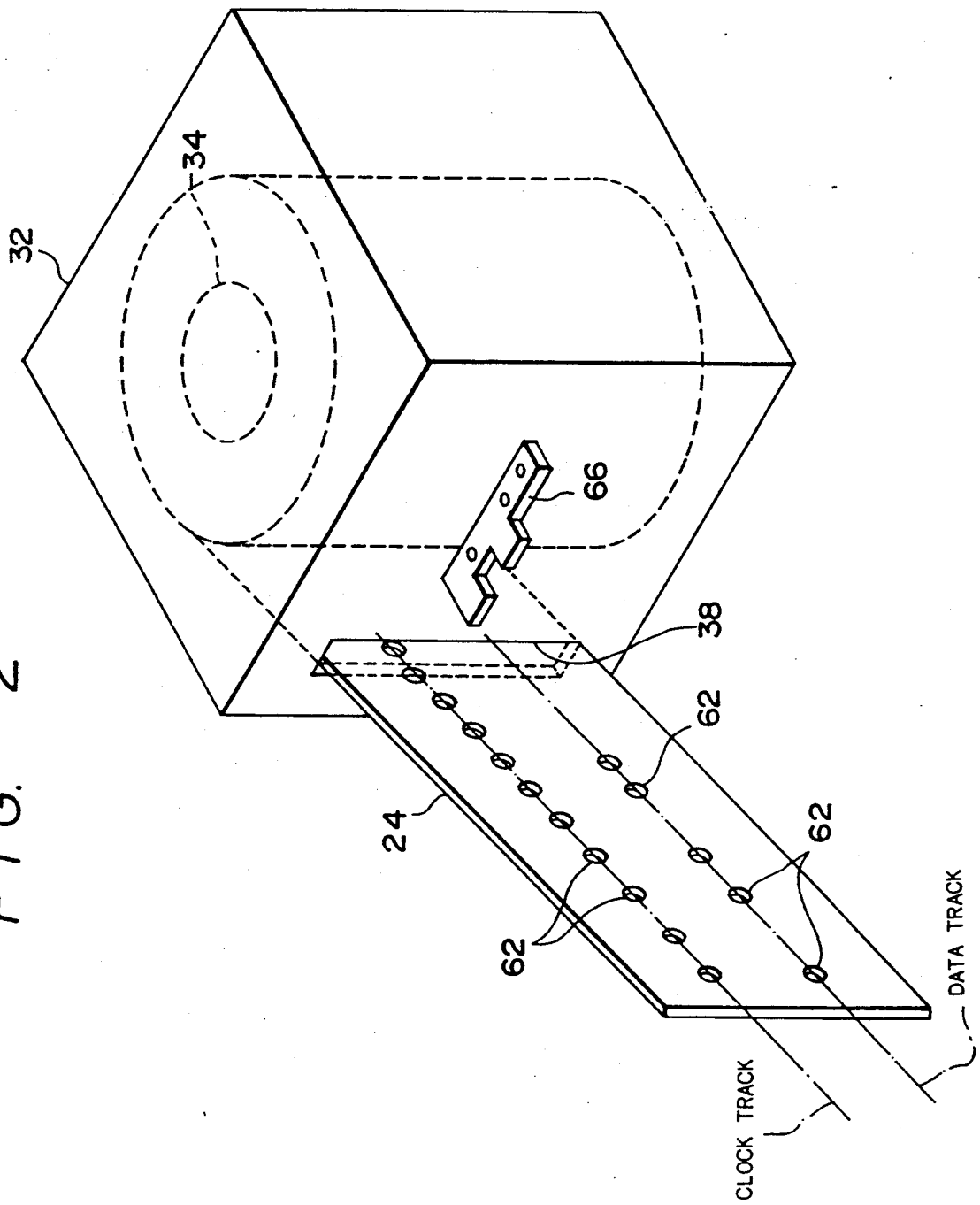
FIG. 2 is a perspective view showing an end portion of a color photographic paper which is loaded into a magazine.

As shown in FIG. 2, the end portion of the color photographic paper 24 has a plurality of punch holes 62 representing data information about the characteristics of the color photographic paper 24 such as the type, size, manufacturer's serial number, and the manufacturer, etc. The punch holes 62 are arranged in two rows along the length of the color photographic paper 24. One of the two rows is used as a data track corresponding to the type, size, manufacturer's serial number and the manufacturer designated in order from the free end of the color photographic paper 24. The other row is used as a clock track provided at each prescribed pitch. The punch holes 62 have the type, size, manufacturer's serial number and the manufacturer specially fixed according to the number of the punch holes 62 continuously formed along the length of the color photographic paper 24 within a prescribed clock (the number of the prescribed punch holes of the clock track).

A light projecting unit 64A and light receiving unit 64B, which constitute a photoelectric sensor 64, are provided on the downward side of the receiver 36 so as to form a passage along which light passes through the punch holes 62 conveyed therebetween. The photoelectric sensor 64 is connected to the control unit 20. When color photographic paper 24 is conveyed out from the magazine 32 and its end portion passes between the light projecting unit 64A and the light receiving unit 64B, the punch holes 62 are detected by the photoelectric sensor 64. Next, the control unit 20 counts the number of punch holes 62. The number of punch holes 62 are stored in a memory. The photoelectric sensor 64 is set to operate only during a prescribed period of time in which the end portion of the color photographic paper 24 initially loaded in the magazine 32 passes through the photoelectric sensor 64.

An ID chip 66 formed with prescribed projections and recesses is attached to the lower face opposed to the receiver 36 of the magazine 32. The receiver 36 has a projection-recess detecting sensor 68 as a first detecting means for detecting the state of projections and recesses formed in the ID chip 66. This sensor 68 serves to detect the state of the projections and recesses formed in the ID chip 66. More specifically, the projections and recesses are adopted as bits (binary digits) respectively and the ID chip 66 has five projection and recess portions in total in which a projection is detected as "1" and a recess is detected as "0". It is therefore possible to distinguish a magazine corresponding to 5 bits ($2^5=32$).

A description will hereinafter be made of the operation of the present embodiment.

When light rays are radiated from the light source 12, they travel to a print position. One frame of the negative film 18, which is held by the negative carrier 16, is positioned at the print position. The light rays pass through the negative film 18. The transmitted light rays concentrate on the lens 22 to be focused on the color photographic paper 24 when the shutter 26 is opened. When the time comes to expose the color photographic paper 24 to the respective colors, the corresponding filters are inserted into the optical path to filter out the color corresponding to one of the inserted filters.

When the prescribed exposure time has elapsed, the shutter 26 is inserted into the optical path to shield the same. As a consequence, an image recorded on the negative film 18 can be printed on the color photographic paper 24.

The thus printed color photographic paper 24 is conveyed through the reservoir unit 44 to the processor unit 46 where developing, fixing and water washing processes are effected. It next reaches the drying unit 54. Although the conveying speed of the color photographic paper 24 at the time that print processing is effected is different from the transfer speed at the processor unit 46, the difference therebetween is canceled because the reservoir unit 44 makes it possible to place the color photographic paper 24 in a holding state.

The drying unit 54 supplies the color photographic paper 24 wound on the drying drum 56 with hot air thereby drying it. The dried color photographic paper 24 is then cut to prescribed lengths (for each image). In the sorter unit 60 the cut color photographic papers 24 are sorted to a certain order. Since the conveying of the color photographic paper 24 is temporarily stopped by the cutter unit 58 to cut the color photographic paper 24, there is a difference between the conveying speed of the paper 24 at the cutter unit 58 and that at the drying unit 54. However, such a difference in the conveying speeds can be nullified because a loop in the color photographic paper 24 can be formed between the drying unit 54 and the cutter unit 58.

The exposure time at the time of print processing is arithmetically calculated based on image density, lens balance, film balance and paper balance. In other words, the coefficients and constants of the arithmetic expression vary depending upon the lens balance, the film balance and the paper balance.

Image density is recognized by sensing transmitted light rays through the negative film 18 by the CCD sensor 28. The transmitted light rays sensed by the CCD sensor 28 are photoelectrically converted into an electrical signal and supplied to the control unit 20. The control unit 20 arithmetically operates the exposure time of each color based on the supplied signal. In addition, the film balance and the lens balance are set based on the operation positions of the dials on the control panel 30.

Figure 3:
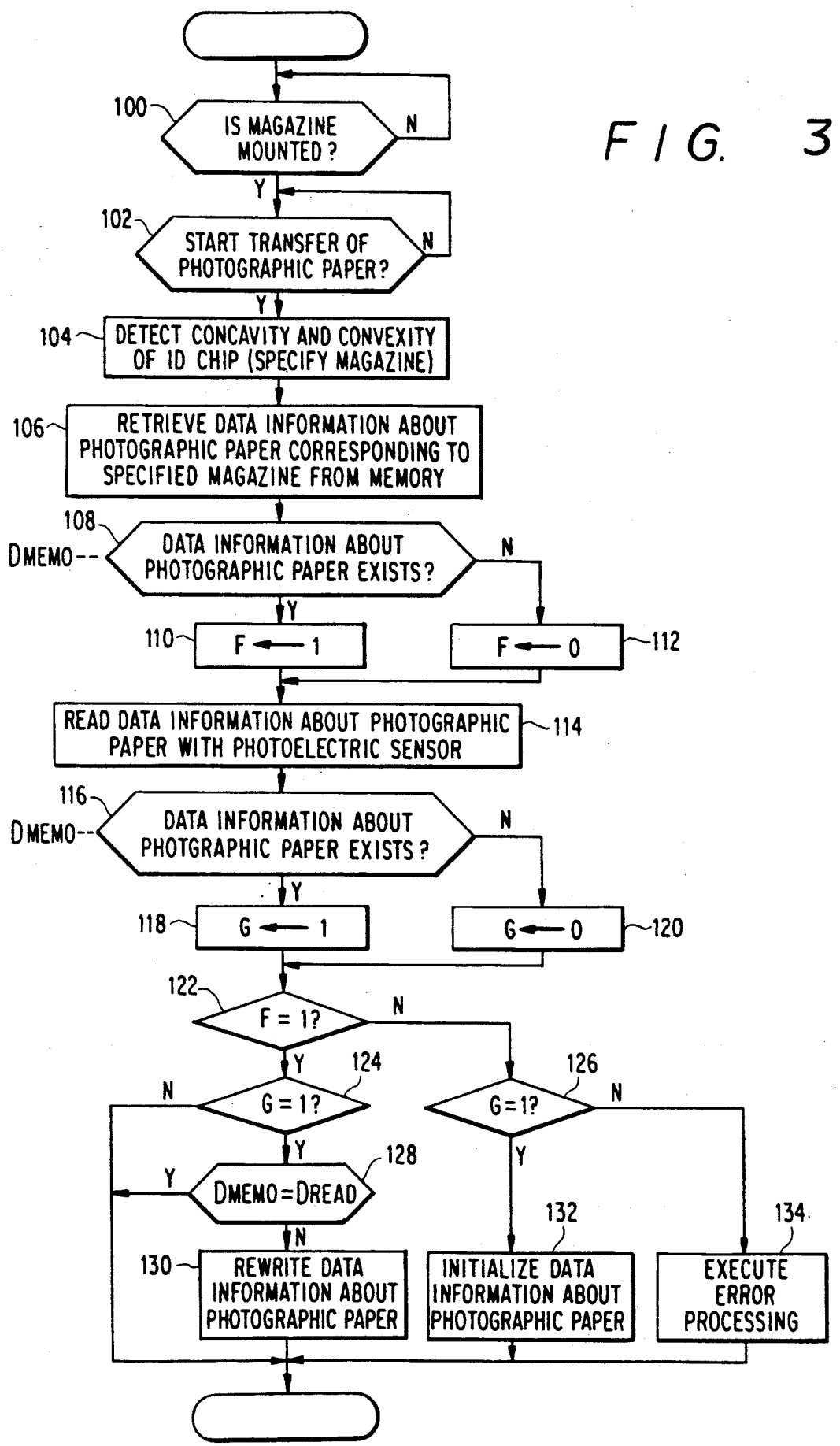
FIG. 3 is a flow chart for describing the procedure used to read data information about the photographic paper.

Paper balance differs according to the magazine 32 to be mounted in the receiver 36. A description will hereinafter be made of the setting of paper balance of the color photographic paper 24 to be used in accordance with a flow chart shown in FIG. 3.

When it is detected in Step 100 that the magazine 32 has been mounted in the receiver 36, the procedure routine advances to Step 102, where it is determined whether or not color photographic paper 24 has been discharged form the magazine 32. When conveyance of the color photographic paper 24 therefrom starts in Step 102, the routine proceeds to Step 104, where the projections and recesses of the ID chip 66 are detected by the projection-recess detecting sensor 68. Thus, the magazine mounted thereon can be specified.

In the next step 106, data information about the color photographic paper 24 corresponding to the specified magazine 32 in Step 104 is retrieved from a table in which the data information on the color photographic paper corresponding to the magazines is stored in the memory of the control unit 20. Next, it is determined in Step 108 from the retrieved results whether or not the data information on the photographic paper is present. If it is determined to be positive, the routine proceeds to Step 110, where a flag F is set to "1". If it is judged to be negative, the routine advances to Step 112, where the flag F is reset to "0", and thereafter, both routines proceed to Step 114.

In Step 114, the photoelectric sensor 64 reads the punch holes 62 formed in the end portion of the color photographic paper 24 so as to obtain data information about the color photographic paper 24. However, when the color photographic paper 24 which has been loaded into the magazine 32 mounted in the receiver 36 has already been used, the punch holes 62 may not be detected. It is therefore determined in Step 116 whether or not the photoelectric sensor 64 has read the punch holes 62. That is to say, it is determined whether or not the data information about the color photographic paper 24 exists. If it is determined to be positive, the routine proceeds to Step 118, where a flag G is set to "1". If it is determined to be negative, the routine advances to Step 120, where the flag G is reset to "0". Then both routines proceed to Step 122.

It is determined in step 122 whether or not the flag F has been set. If it is determined to be positive, the routine proceeds to Step 124, whereas if it is determined to be negative, the routine proceeds to Step 126. It is determined in these Steps 124, 126 whether or not the flag G has been set. From the results, a table representing the contents of four data representative of information about color photographic paper as shown in FIG. 4 can be obtained from the judgements in Steps 122, 124 and 126. In other words, when data information ($D_{MEMO}$) about the color photographic paper 24 is stored in the memory of the control unit 20 and the photoelectric sensor 64 does not detect the punch holes 62 (when it is determined to be positive in Step 122 and when it is determined to be negative in Step 124), it is determined that data information about the color photographic paper 24 to be loaded into the present magazine 32 mounted in the receiver 36 has already corresponded to the data information about the color photographic paper 24 loaded into the previous magazine 32 and the present data have already been stored in the memory in association with the previous data. As a consequence, the memory of the control unit 20 is kept in status quo, so that the procedure routine is terminated.

In addition, when the data information about the color photographic paper 24 ($D_{MEMO}$) are stored in the memory of the control unit 20 and the photoelectric sensor 64 detects the punch holes 62 to read data information ($D_{READ}$) about the color photographic paper 24 (when it is determined to be positive in Step 122 and when it is determined to be positive in Step 124), it is necessary to determine whether or not data information about the color photographic paper 24 to be loaded into the present magazine 32 mounted in the receiver 36 corresponds to the data information about the color photographic paper 24 loaded into the previous magazine 32 in the receiver 36. Therefore, the routine proceeds from Step 124 to Step 128, where it is determined whether or not $D_{MEMO}$ is equal to $D_{READ}$. If $D_{MEMO} = D_{READ}$, it is determined that the color photographic paper 24 of the same type as the previous paper has been reloaded in the magazine 32, the memory of the control unit 20 is maintained as it is. If $D_{MEMO} \neq D_{READ}$, it is judged that the color photographic paper 24 is different in type from the previous one loaded into the magazine 32. Therefore, the routine proceeds to Step 130, where the data information about the color photographic paper 24 stored in the memory of the control unit 20 is written.

Next, when no data information ($D_{MEMO}$) about the color photographic paper 24 is stored in the memory of the control unit 20 and the photoelectric sensor 64 detects the punch holes 62 to thereby read the data information ($D_{READ}$) about the color photographic paper 24 (when it is determined to be negative in Step 122 and when it is determined to be positive in Step 124), it is determined that the magazine 32 has initially been mounted in the receiver 36. Therefore, the routine proceeds to Step 132, where the read data information ($D_{READ}$) about the color photographic paper 24 is associated with the mounted magazine 32 to be stored in the memory of the control unit 20 (the information is set to an initial condition).

Further, when no data information ($D_{MEMO}$) about the color photographic paper 24 is stored in the memory of the control unit 20 and the photoelectric sensor 64 does not detect the punch holes 62 (when it is determined to be negative in Step 122 and when it is determined to be negative in Step 124), it is determined that the memory of the control unit 20 has developed an error upon storing the data information therein or an error was produced upon reading the same therefrom, whereupon the routine proceeds to Step 134, where error processing is effected.

According to the present embodiment, a plurality of magazines 32 capable of being mounted in the receiver 36 are associated with the respective color photographic papers 24 loaded into these magazines 32 so that the data information about the color photographic papers 24 is stored in the memory of the control unit 20. As a consequence, it is unnecessary to take into consideration the data information about the color photographic paper 24 when in normal print operation or when a magazine is replaced with new one. Thus, the data information can automatically be determined and processed.

Even when the color photographic paper 24 within the magazine 32 is replaced with a new one, the data information about the color photographic paper 24 can be renewed or rewritten by reading the punch holes 62 formed in the end portion of the color photographic paper, so that no misjudgment of the color photographic paper 24 is made.

A description has been made of the setting of the paper balance by way of example in the present embodiment. However, the data information about the color photographic paper is also applicable to the following processes.

(1) Width data;

The width of a guide at a portion used to run the color photographic paper in a conveying system can automatically be set based on the width data.

(2) Length data:

When the length of a color photographic paper to be used when in print operation is subtracted from the length of the initially set color photographic paper based on the length data, the remaining length of the color photographic paper can be obtained. Thus, if the remaining length is shown in a table form, the operator can recognize it. In addition, if data information about the remaining length is stored in the memory, the operator can also recognize it for each magazine.

(3) Data about the type of faces of the color photographic papers:

Temperature used in the drying unit 45 can automatically be controlled according to the face type, and the type of faces can also be represented.

(4) Data about the manufacturing data:

The printing condition can be changed in view of the deterioration in sensitivity of the color photographic paper from a difference in the time-dependent variation between the manufacturing data and the printing data of the color photographic paper.

In the present embodiment, the color photographic paper 24 has punch holes 62 defined therethrough and the photoelectric sensor 64 reads the same. However, a mechanically-operated sensor such as a counter may also read the holes. Marks corresponding to information may include other marks such as bar codes, concavities and convexities, etc. When the bar codes are employed as marks, a bar-code reader may be provided to detect the same. On the other hand, when concavities and convexities are used as marks, a limit switch may be disposed to detect the same.

Further, the punch holes 62 are defined in the end portion of the color photographic paper 24 in the present embodiment. However, bar codes or magnetic codes may be used as an alternative to the punch holes 62. In addition, a reader may be provided at the end portion of the color photographic paper 24 to define the punch holes 62 to be punched therein. In this case, the reader is only removed from the end portion thereof to make it possible to reuse the same data information in the color photographic paper 24. It is also feasible to make it unnecessary to form the punch holes 62 to be punched over the entirety of the color photographic paper 24.

Having now fully described the invention, it will be apparent to those skilled in the art that many changes and modifications can be made without departing form the spirit or scope of the invention as set forth herein.

What is claimed is:

1. A photoprinter comprising:
   first detecting means for detecting first information used to specify a magazine for loading a photosensitive material wound in a layered form from a first information portion provide for each magazine when the magazine is mounted;
   second detecting means for determining, at the time the magazine is mounted, the existence of second information related to the setting of the exposure conditions, and for detecting said second information, including at least the type of the photosensitive material, from a second information portion provided in an end portion of the photosensitive material loaded into the magazine when said second information is determined to exist;
   memory means for storing the first information detected by said first detecting means and for storing the second information detected by said second detecting means corresponding to the first information stored therein;
   determination means for determining, at the time the magazine is mounted, whether corresponding second information is stored in the memory means corresponding to the first information detected by said first detecting means and for obtaining the corresponding second information stored in the memory means using the first information detected by said first detecting means when the corresponding second information is stored in the memory means; and
   rewriting means for rewriting the second information previously stored in the memory means into newly detected second information when the corresponding second information obtained by said determination means does not coincide with the second information detected by the second detecting means.

2. A photoprinter according to claim 1, wherein said rewriting means does not rewrite the second information stored in the memory means and applies the second information read from the memory means to the exposure condition on the basis of the first information detected by said first detecting means when the second information is determined not to exist by said second detecting means.

3. A photoprinter according to claim 1, wherein said rewriting means does not rewrite the second information stored in the memory means and applies the second information read from the memory means to the exposure condition when said second information obtained coincides with the second information detected by the second detecting means.

4. A photoprinter according to claim 1, wherein said second information portion comprises a plurality of punch holes in the photosensitive material, and said second detecting means comprises a photoelectric sensor for detecting said punch holes.

5. A photoprinter according to claim 1, wherein said second information portion comprises a plurality of punch holes in said photosensitive material, and said second detecting means comprises a mechanically-operated sensor for detecting said punch holes.

6. A photoprinter according to claim 1, wherein said second information portion comprises bar codes, and said second detecting means comprises a bar-bode reader for detecting said bar codes.

7. A photoprinter according to claim 1, wherein said second information portion comprises concavities and convexities, and said second detecting means comprises a limit switch for detecting said concavities and convexities.

8. A photoprinter according to claim 1, wherein said first information portion provided at said magazine comprises a chip formed with projections and recesses, and said first detecting means comprises a projection-recess detecting sensor for detecting said projections and recesses of the chip.

9. A photoprinter having a printing section in which a photosensitive material is printed, comprising:
   first detecting means for detecting, at the time the magazine is mounted, first information used to specify a magazine loaded with a photosensitive material wound in a layered form from a first information portion provided for each magazine;
   second detecting means for determining, at the time the magazine is mounted, the existence of second information related to the setting of the exposure conditions, and for detecting the second information, including at least the type of the photosensitive material from a second information portion provided in an end portion of the photosensitive material loaded into the magazine when the second information is determined to exist, memory means for storing the first information detected by said first detecting means and for storing the second information detected by said second detecting means corresponding to the first and second information stored therein;

determination means for determining, at the time the magazine is mounted, whether corresponding second information is stored in the memory means corresponding to the first information detected by said first detecting means and for obtaining the corresponding second information stored in the memory means using the first information detected by said first detecting means when the corresponding second information is stored in the memory means;

rewriting means for rewriting the second information previously stored in the memory means into newly detected second information when the corresponding second information obtained by said determination means does not coincide with the second information detected by the second detecting means; and control means for controlling said printing section on the basis of the second information rewritten by said rewriting means.

10. A photoprinter according to claim 9, wherein said rewriting means does not rewrite the second information stored in the memory means and applies the second information read from the memory means to the exposure condition on the basis of the first information detected by said first detecting means when the second information is determined not to exist by said second detecting means, and wherein said control means controls said printing section on the basis of the second information read from the memory means.

11. A photoprinter according to claim 9, wherein said rewriting means does not rewrite the second information stored in the memory means and applies the second information stored in the memory means to the exposure condition when said second information obtained coincides with the second information detected by the second detecting means, and wherein said control means controls said printing section on the basis of the second information stored in the memory means.

12. A photoprinter according to claim 9, wherein said second information portion comprises a plurality of punch holes in the photosensitive material, and said second detecting means comprises a photoelectric sensor for detecting said punch holes.

13. A photoprinter according to claim 9, wherein said second information portion comprises a plurality of punch holes in the photosensitive material, and said second detecting means comprises a mechanically-operated sensor for detecting said punch holes.

14. A photoprinter according to claim 9, wherein said second information portion comprises bar codes, and said second detecting means comprises a bar-code reader for detecting said bar codes.

15. A photoprinter according to claim 9, wherein said second information portion comprises concavities and convexities, and said second detecting means comprises a limit switch for detecting said concavities and convexities.

16. A photoprinter according to claim 9, wherein said first information portion provided at said magazine comprises a chip formed with projections and recesses, and said first detecting means comprises a projection-recess detecting sensor for detecting said projections and recesses of the chip.

17. A method of determining exposure conditions of a photoprinter comprising the steps of:

detecting first information used to specify a magazine for loading a photosensitive material wound in a layered form from a first information portion provided for each magazine when the magazine is mounted a first time;

detecting, at the time the magazine is mounted the first time, second information related to the setting of the exposure conditions including at least the type of the photosensitive material from a second information portion provided in an end portion of the photosensitive material loaded into the magazine;

storing the first and second information with the first information corresponding to the second information;

detecting first information used to specify a magazine for loading a photosensitive material wound in a layered form from a first information portion provided for each magazine when the magazine is mounted a second or subsequent time;

determining, at the time the magazine is mounted a second or subsequent time, whether the second information stored on the basis of the first information detected the first time exists;

attempting, at the time the magazine is mounted the second or subsequent time, detection of second information related to setting of the exposure conditions including at least a type of photosensitive material from a second information portion provided in an end portion of the photosensitive material loaded into the magazine; and rewriting the second information stored with the second information detected at the second or subsequent time when the second information stored is not identical to the second information detected the second or subsequent time.

18. A method of determining the exposure conditions of a photoprinter according to claim 17, wherein rewriting of the second information does not occur when the second information is not detected at the second or subsequent time.

19. A method of determining the exposure conditions of a photoprinter according to claim 17, wherein rewriting does not occur when the second information stored is identical to the second information detected at the second or subsequent time.

* * * * *